(12) United States Patent
Heigl

(10) Patent No.: US 7,957,905 B2
(45) Date of Patent: Jun. 7, 2011

(54) DATA PROCESSING METHOD FOR DETERMINING ACOUSTIC VELOCITIES FROM ACOUSTIC WELL LOGGING INSTRUMENTS

(75) Inventor: Werner M. Heigl, Katy, TX (US)

(73) Assignee: Apache Corporation, Houston, TX (US)

( * ) Notice: Subject to any disclaimer, the term of this patent is extended or adjusted under 35 U.S.C. 154(b) by 265 days.

(21) Appl. No.: 12/050,331

(22) Filed: Mar. 18, 2008

(65) Prior Publication Data

US 2009/0240436 A1    Sep. 24, 2009

(51) Int. Cl.
*G01V 1/40* (2006.01)
*G06F 17/18* (2006.01)
(52) U.S. Cl. ............... 702/11; 702/6; 702/179; 702/181
(58) Field of Classification Search ................ 702/6–11, 702/179–182
See application file for complete search history.

(56) References Cited

U.S. PATENT DOCUMENTS

| | | | | | |
|---|---|---|---|---|---|
| 5,638,269 | A | * | 6/1997 | Fournier et al. ................. | 702/14 |
| 5,831,934 | A | * | 11/1998 | Gill et al. ......................... | 367/25 |
| 6,058,074 | A | * | 5/2000 | Swan et al. ...................... | 367/38 |

* cited by examiner

*Primary Examiner* — Andrew Schechter
*Assistant Examiner* — Phuong Huynh
(74) *Attorney, Agent, or Firm* — Richard A. Fagin

(57) ABSTRACT

A method for estimating interval travel time of an Earth formation using an acoustic well logging instrument having a plurality of spaced apart acoustic transmitters and acoustic receivers includes measuring travel time between a transmitter and a receiver for substantially all possible combinations of each of the plurality of transmitters and each of the plurality of receivers. Each of the possible combinations includes a common depth interval of the Earth formations. The method then include determining at least one statistical measure of center of the measured travel times.

24 Claims, 3 Drawing Sheets

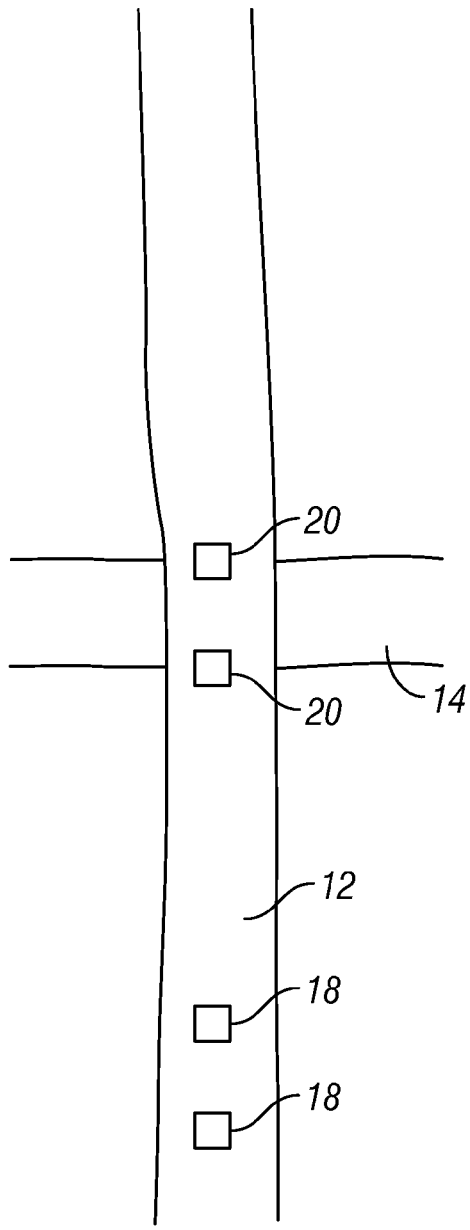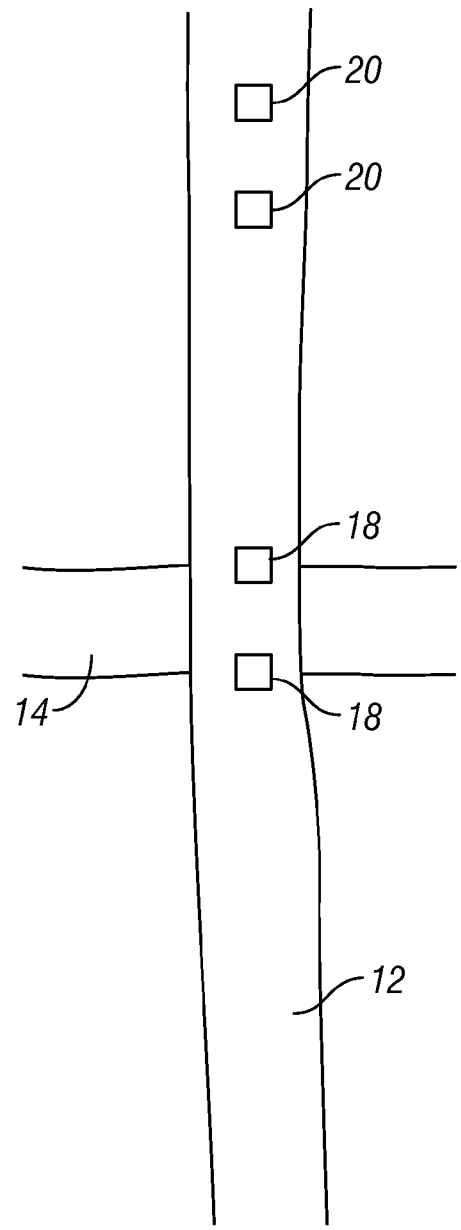
*FIG. 2*  *FIG. 3*

DATA PROCESSING METHOD FOR DETERMINING ACOUSTIC VELOCITIES FROM ACOUSTIC WELL LOGGING INSTRUMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of acoustic well logging. More specifically the invention relates to methods for processing data from acoustic well logging instruments in order to obtain acoustic velocities of subsurface formations.

2. Background Art

Acoustic well logging instruments known in the art include a "sonde" or similar housing structure that can be moved along the interior of a wellbore by means of an armored electrical cable, coiled tubing, drill pipe or similar conveyance. The sonde includes one or more acoustic transmitters that when actuated impart a pulse of acoustic energy into the fluid in the wellbore. The transmitters are typically magnetostrictive or piezoelectric transducers that change shape in response to application of an electrical current pulse to the transducer. The acoustic energy is typically, although not exclusively, in a frequency range of 8 to 30 kHz. The acoustic energy travels through the wellbore fluid and impacts the wall of the wellbore. Relative acoustic velocities of the wellbore fluid and typical subsurface rock formations through which the wellbore is drilled are such that the acoustic energy refracts and travels along the wellbore wall. The wall-traveling energy also refracts back into the wellbore. The re-refracted acoustic energy is detected by one or more acoustic receivers disposed at selected distances along the sonde from the transmitter. The distance along the sonde is typically chosen to provide a substantial travel path along the wellbore wall through the various subsurface rock formations.

Techniques for acoustic well logging known in the art prior to the development of computerized well logging recording systems, many of which carried over into earlier computer-implemented surface recording systems, included what are known as interval transit time determination. In such techniques, a timer is started at the time the acoustic transmitter is actuated. The timer is stopped when acoustic energy detected by the receiver exceeds a selected threshold. The time taken by the acoustic energy to travel from the transmitter to the receiver is related to the acoustic velocity of the wellbore fluid and the formations disposed between the transmitter and the receiver. Early in the development of acoustic well logging instruments, a second receiver was included on the sonde at a different axial spacing than the first receiver. A travel time was determined from the transmitter to each receiver. An "interval transit time" was determinable by subtracting one receiver's acoustic energy travel time from the other's. The "interval" is generally disposed axially between the receivers and is offset by an average refraction angle of the acoustic energy and the distance from the exterior of the sonde to the wellbore wall. Such interval travel time determination substantially eliminated the need to determine the acoustic velocity of the wellbore fluid, however the travel paths in the wellbore for each of the two receivers may be different as a result of irregularities (rugosity) in the wellbore wall and any tilt of the sonde in the wellbore.

The foregoing travel path problems were dealt with by an acoustic well logging instrument known as the borehole compensated ("BHC") instrument. BHC instruments included transmitters disposed at opposite ends of the sonde. Two or four receivers were disposed longitudinally between the transmitters, such that each transmitter included two corresponding receivers spaced at the same selected distances (typically three and five feet) from the transmitter. Four-receiver sondes included two longitudinally offset pairs of receivers, each pair including a three foot spacing and a five foot spacing receiver corresponding to one of the transmitters. The pairs were offset by an amount corresponding to the expected refraction angle of the acoustic energy at the wellbore wall. The offset provided better longitudinal correspondence between the formations investigated by the two receiver pairs. In BHC acoustic well logging, an interval transit time is determined for each receiver pair (or the one receiver pair for both transmitters in two-receiver BHC instruments). Because the corresponding transmitters are on opposed sides of the investigated formation, variations in interval transit time caused by sonde tilt and wellbore rugosity are substantially canceled by averaging the two interval transit times.

Acoustic well logging was initially developed for estimating the fractional volume of pore space ("porosity") in subsurface formations. Later, acoustic well logging was used to correlate surface reflection seismic surveys to the subsurface formations actually penetrated by wellbores. An important parameter for such correlation is the acoustic velocity measured all along the wellbore. In certain types of rock formations, he acoustic velocity can be reduced by interaction of the drilling fluid with such formations proximate the wellbore wall. Such velocity changes are relatively large in certain geologic areas, such as the United States Gulf of Mexico outer continental shelf. To deal with the problem of formation velocity alteration, so called "long spacing" acoustic well logging instruments were developed.

In principle, long spacing acoustic well logging instruments operate the same as BHC well logging instruments, at least with respect to determining interval transit time. The difference between long spacing acoustic well logging instruments and their BHC counterparts is the longitudinal spacing between the transmitters and receivers. A typical long spacing acoustic well logging instrument includes two transmitters at one end of the sonde spaced apart by two feet. A first receiver is disposed near the other end of the sonde at about eight feet from the nearer transmitter, and a second receiver is spaced two feet further therefrom along the sonde. The relatively long axial span traveled by the acoustic energy along the wellbore wall is believed to result in acoustic energy traveling faster in the unaltered formation immediately adjacent to the altered formations at the wellbore wall. Thus, first energy arrivals will more likely correspond to acoustic energy traveling through faster, unaltered formations.

Long spacing acoustic well logging instruments are designed asymmetrically, with transmitters at one end and receivers at the other, primarily to avoid making the sonde so long as to be impractical to use. It is known in the art to obtain the equivalent of BHC measurements from a long spacing acoustic well logging instrument by what is known as the "depth derived BHC" technique. In depth derived BHC acoustic analysis, an interval transit time is determined at a formation adjacent to the transmitters at a first time. By reciprocity, such interval transit time may be determined using signals from one receiver and two transmitters in the same manner as explained above for one transmitter and two receivers, namely, by subtracting a travel time from one transmitter to a selected receiver from the travel time of the other transmitter. The foregoing interval travel time is stored and is later averaged with the interval transit time determined between the receivers when the instrument has moved such that the receivers are adjacent to the same formation previously evaluated by the transmitters.

It has been observed that depth derived BHC techniques may not be adequate to account for certain wellbore conditions. There exists a need to derive better estimates of formation acoustic velocities using long spacing acoustic well logging instruments known in the art.

SUMMARY OF THE INVENTION

One aspect of the invention is a method for estimating interval travel time of an Earth formation using an acoustic well logging instrument having a plurality of spaced apart acoustic transmitters and acoustic receivers. The method according to this aspect of the invention includes measuring travel time between a transmitter and a receiver for substantially all possible combinations of each of the plurality of transmitters and each of the plurality of receivers. Each of the possible combinations includes a common depth interval of the Earth formations. The method then includes determining at least one statistical measure of center of the measured travel times.

A method for well logging according to another aspect of the invention includes moving an acoustic well logging instrument having a plurality of spaced apart acoustic transmitters and acoustic receivers along a wellbore drilled through subsurface formations. The transmitters are actuated at selected times. Acoustic energy is detected at the receivers such that a travel time of the acoustic energy from identifiable transmitters to identifiable receivers is determined. Acoustic energy travel time is determined between substantially all possible combinations of each of the plurality of transmitters and each of the plurality of receivers, wherein each of the possible combinations includes a common depth interval of the Earth formations. At least one statistical measure of center of the measured interval travel times is determined.

Other aspects and advantages of the invention will be apparent from the following description and the appended claims.

BRIEF DESCRIPTION OF THE DRAWINGS

FIG. 2 and FIG. 3 show, respectively, transmitters and receivers of the well logging instrument of FIG. 1 disposed near a particular subsurface rock formation.

DETAILED DESCRIPTION

Figure 1:
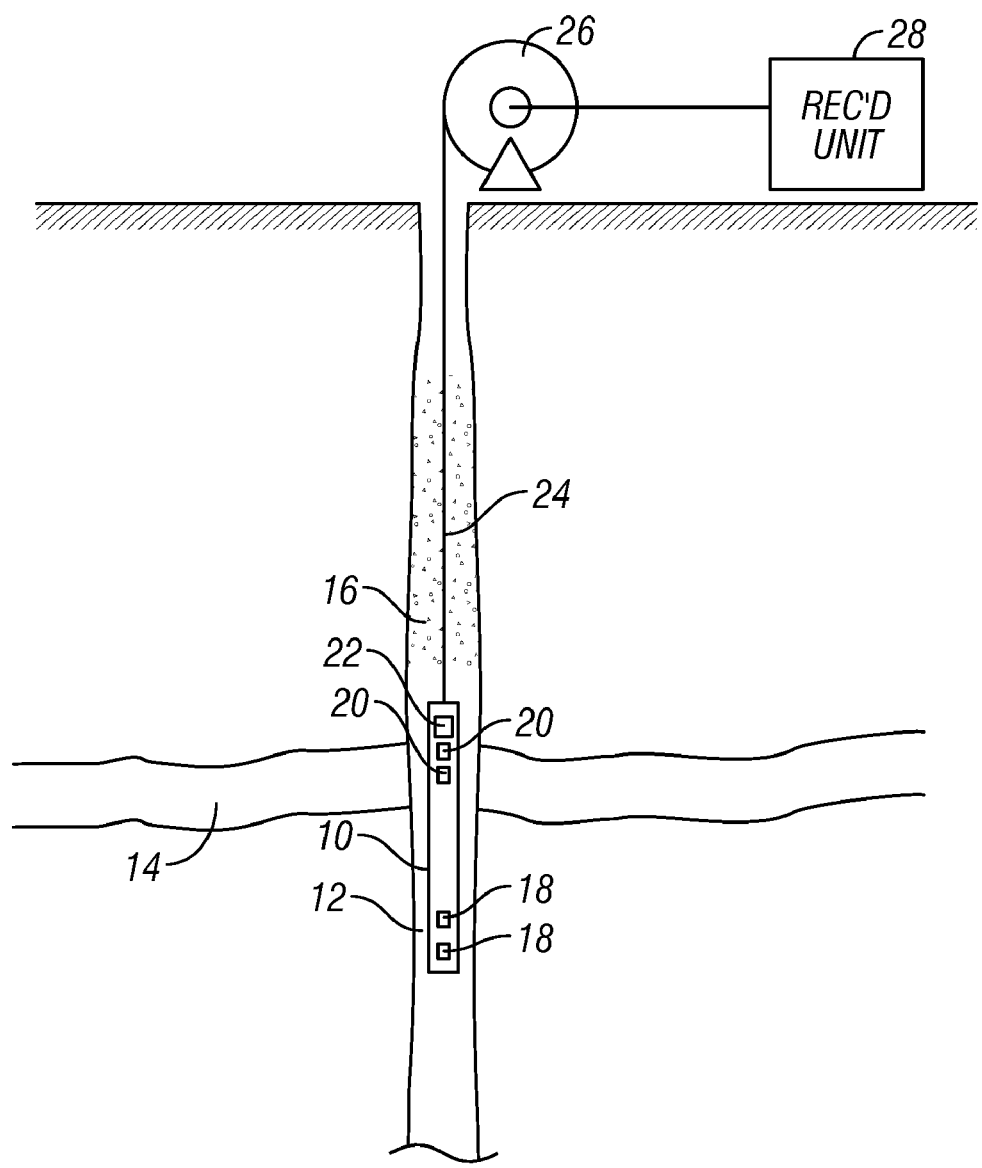
FIG. 1 shows an example of a long spacing acoustic well logging instrument making measurements in a wellbore.

An example of a long spacing acoustic well logging instrument making measurements in a wellbore is shown in FIG. 1. A wellbore 12 is drilled through the subsurface, including various rock formations such as an example formation shown at 14. The wellbore 12 is typically filled with fluid 16 such as drilling mud during well logging operations. During such operations, a long spacing acoustic well logging instrument 10 is moved along the interior of the wellbore 12 by extending and retracting an armored electrical cable 24 coupled at one end to the top of the instrument 10. The cable 24 is extended and withdrawn by a winch 26 or similar device known in the art. Electrical and/or optical conductors in the cable 24 provide signal communication between the instrument 10 and a recording unit 28 disposed at the Earth's surface. As explained in the Background section herein, the manner of conveyance of the well logging instrument 10 through the wellbore 12 shown in FIG. 1 is only one example of such conveyance. Any other conveyance known in the art, including without limitation, tubing, drill pipe, coiled tubing, hydraulic pumping, may be used to move the well logging instrument 10 along the wellbore 12.

The well logging instrument 10 includes two spaced apart acoustic transmitters 20 disposed along the instrument 10. The instrument 10 also includes two acoustic receivers 18 spaced apart from each other by approximately the same spacing as is between the transmitters 20. The transmitters 20 and receivers 18 are spaced from each other by a distance selected such that acoustic energy arriving at the receivers 18 from the transmitters 20 is likely to propagate at a speed above that of the formations at the wellbore/formation interface, which may have been altered by the fluid 16 in the wellbore 12. In one non-limiting example, the spacing between transmitters and receivers is 2 feet, and the spacing between the nearer transmitter and receiver is about 8 feet. The instrument 10 is operated such that the transmitters 20 are actuated at selected times. A time from actuation of each transmitter 20 to the detection of acoustic energy at each receiver 18 is recorded. As explained in the Background section herein, the arrival time of what is believed to be acoustic energy from one of the transmitters may be determined when the acoustic signal amplitude exceeds a selected threshold. Circuitry to operate the transmitters 20, to detect acoustic signals from the receivers 18, and to determine acoustic signal travel times is shown generally at 22. The circuits 22 may include signal telemetry devices known in the art for communicating data from a well logging instrument to a recording unit along an electrical and/or optical conductor, e.g., in the cable 24. The type of telemetry and the particular data transmitted by the telemetry are not intended to limit the scope of the present invention.

For purposes of explaining a method according to the invention, particular positions of the transmitters and receivers with respect to a formation being investigated will now be explained with reference to FIG. 2 and FIG. 3. In FIG. 2 and FIG. 3, only the transmitters and receivers from the instrument (10 in FIG. 1) for clarity of the illustration. FIG. 2 shows the well logging instrument disposed in the wellbore 12 such that the transmitters 20 are disposed adjacent the formation being investigated 14. When the instrument is disposed as shown in FIG. 2, the transmitters 20 may each be actuated and signals detected at each of the receivers 18. Travel time of acoustic energy from each transmitter to each receiver may be determined. Thus, for an instrument such as shown in FIG. 1, a minimum of four separate travel times may be recorded, T1R1, T1R2, T2R1 and T2R2, in which T represents a transmitter and the number following identifies the particular transmitter, and R represents a receiver identified by the number following. The four separate travel times thus measured may be used to compute two interval travel times, where the interval is disposed between the transmitters 20 (corresponding to formation of interest 14). One interval travel time corresponds to the shallower disposed receiver 18, the other corresponds to the deeper disposed receiver 18.

FIG. 3 shows the instrument moved along the wellbore 10 such that the receivers 18 are disposed proximate the formation of interest 14. The same four travel times may be measured as for the configuration shown in FIG. 2, however, for the configuration shown in FIG. 3, two interval travel times may be calculated to correspond to the formation of interest 14 for each of the transmitters 20. Those skilled in the art will recognize the acquisition and interval travel time calculation techniques shown in FIGS. 2 and 3 as "depth derived BHC" measurement, as explained in the Background section herein. In methods according to the invention, other possible travel time measurements based on all possible combinations of receiver and transmitter position may be used to provide additional interval travel time measurements for improved determination of the most likely value of interval travel time for each formation of interest.

Figure 4:
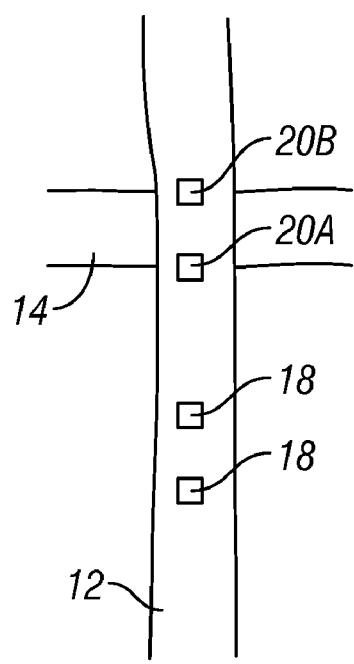
FIGS. 4 though 7 show alternative positioning of the instrument proximate the particular formation to obtain different transmitter to receiver travel time measurements.
Figure 5:
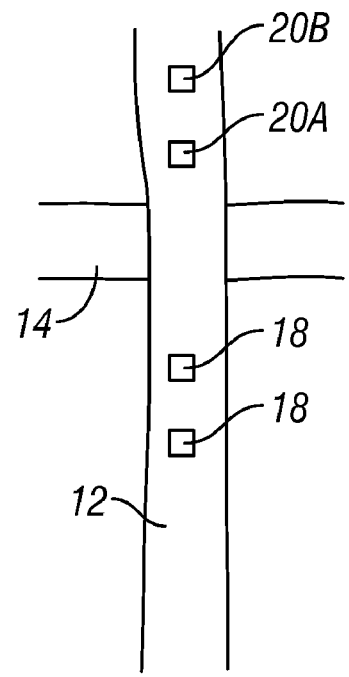

FIGS. 4 and 5 show another possible arrangement for determining interval travel time with different transmitter and receiver positions than as shown in FIGS. 2 and 3. In FIG. 4, the transmitters, indicated as lower transmitter 20A and upper transmitter 20B are disposed proximate the formation of interest 14. A travel time may be determined, in FIG. 4, for the lower transmitter 20A to each receiver 18. In FIG. 5, the instrument has moved a sufficient distance along the wellbore 12 so that the lower transmitter 20A is now positioned where the upper transmitter 20B was positioned previously as shown in FIG. 4. Interval travel time for each receiver 18 may be calculated by determining difference between travel time with the lower transmitter 20A positioned as shown in FIG. 4 and the travel time with the lower transmitter 20A positioned as shown in FIG. 5. The same procedure may be performed for the upper transmitter 20B if the upper transmitter 20B is positioned with respect to the formation of interest 14 as shown in FIG. 4 and FIG. 5, respectively.

Figure 6:
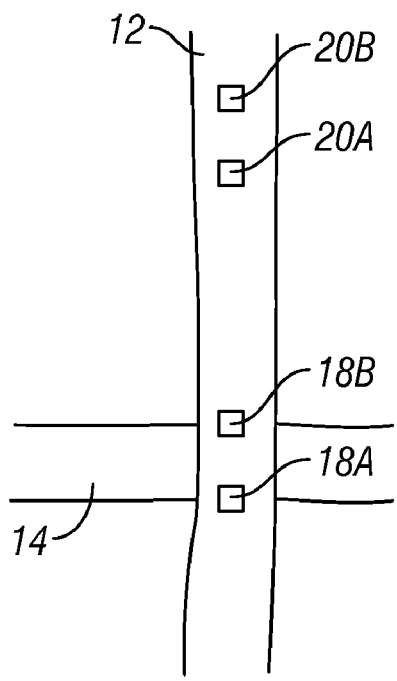
Figure 7:
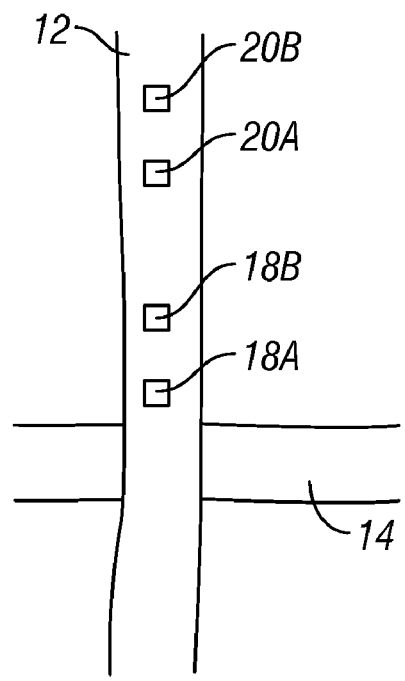

FIG. 6 and FIG. 7 show a similar interval travel time determination procedure as shown in FIG. 4 and FIG. 5, but in the example shown in FIGS. 6 and 7, the lower receiver, shown at 18A, is positioned proximate the formation of interest 14 first at the bottom, then at the top thereof. Thus for each transmitter 20A, 20B, an interval travel time may be determined for the lower receiver 18A. A similar procedure may be performed for the upper receiver 18B.

A total of eight different interval travel times corresponding to the same formation of interest may be determined using the procedures explained with reference to FIGS. 2 through 7. In examples of a method according to the invention, the entire set of interval travel times may be processed to obtain improved measures of interval travel time. In various examples of a method according to the invention, all possible combinations of transmitter position and receiver position for any particular well logging instrument that provide travel time measurements corresponding to a same interval or formation of interest are used to obtain interval travel time measurements. For well logging instruments having different spacings between the respective transmitters and receivers, it is necessary to normalize certain of the interval travel time or travel time measurements so that they correspond to the same acoustic travel path length.

Because of the larger number of interval travel time measurements made using the techniques explained above with reference to FIGS. 2 through 7, it is feasible to use statistical analysis techniques to determine the most likely interval travel time for any formation of interest. A number of different statistical analysis techniques may be used. In one example, a median of the interval travel times maybe determined. In another example, the mode of the interval travel times may be determined. In another example, the mean of the interval travel times may be determined.

To assist in evaluating the characteristics of the interval travel times, a method according to some examples may include determining at least one statistical measure of variation of the measured interval travel times. The statistical measure of variation may include, for example, variance, standard deviation, interquartile range, range and median absolute variation. In another example, the middle of the range ("midrange") of a determined range of values of interval travel time is determined. Outliers may be determined, for example, as any travel time value that is greater than or less than 1.5 times the interquartile range. Other outlier determinations may be based on a priori information about likely ranges of travel times for each transmitter and receiver combination.

The interval travel time determined as explained above may be converted to acoustic velocity or "slowness" using techniques well known in the art.

Methods according to the invention may provide more robust determination of interval travel time (and corresponding measures slowness and velocity) than is possible using the limited number of possible transmitter and receiver position combinations using methods known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for estimating interval travel time of an Earth formation using an acoustic well logging instrument having a plurality of spaced apart acoustic transmitters and acoustic receivers, the method comprising:
   measuring travel time between a transmitter and a receiver for substantially all possible combinations of each of the plurality of transmitters and each of the plurality of receivers by determining a time interval between a time of actuating each of the transmitters and a time of arrival of acoustic energy for each of the transmitters at each of the receivers, the time of arrival determined when acoustic amplitude at each receiver exceeds a selected threshold, wherein each of the possible combinations includes a common depth interval of the Earth formations;
   processing the travel times in a processor to determine at least one statistical measure of the center of the measured travel times; and
   using the statistical measure to determine the interval travel time in the common depth interval.

2. The method of claim 1 wherein the statistical measure of center comprises a mean.

3. The method of claim 1 wherein the statistical measure of center comprises a median.

4. The method of claim 1 wherein the statistical measure of center comprises a mode.

5. The method of claim 1 further comprising determining at least one statistical measure of variation of the measured interval travel times.

6. The method of claim 5 wherein the statistical measure of variation comprises variance.

7. The method of claim 5 wherein the statistical measure of variation comprises standard deviation.

8. The method of claim 5 wherein the statistical measure of variation comprises interquartile range.

9. The method of claim 5 wherein the statistical measure of variation comprises range.

10. The method of claim 5 wherein the statistical measure of variation comprises median absolute variation.

11. The method of claim 1 further comprising, deleting from the measured travel times having values outside a selected validity threshold.

12. The method of claim 1 further comprising normalizing each measured travel time for a distance between the respective transmitter and receiver.

13. A method for well logging, comprising:
moving an acoustic well logging instrument having a plurality of spaced apart acoustic transmitters and acoustic receivers along a wellbore drilled through subsurface formations;
actuating the transmitters at selected times;
detecting acoustic energy at the receivers such that a travel time of the acoustic energy from identifiable transmitters to identifiable receivers is determined;
determining acoustic energy travel time between substantially all possible combinations of each of the plurality of transmitters and each of the plurality of receivers, the acoustic energy travel time being an interval between actuating a transmitter and detecting acoustic energy, the detecting acoustic energy determined when an acoustic amplitude at a receiver exceeds a selected threshold, wherein each of the possible combinations includes a common depth interval of the Earth formations;
determining at least one statistical measure of center of the measured interval travel times; and
using the statistical measures to determine interval travel times of the subsurface formations in the common depth intervals.

14. The method of claim 13 wherein the statistical measure of center comprises a mean.

15. The method of claim 13 wherein the statistical measure of center comprises a median.

16. The method of claim 13 wherein the statistical measure of center comprises a mode.

17. The method of claim 13 further comprising determining at least one statistical measure of variation of the measured interval travel times.

18. The method of claim 17 wherein the statistical measure of variation comprises variance.

19. The method of claim 17 wherein the statistical measure of variation comprises standard deviation.

20. The method of claim 17 wherein the statistical measure of variation comprises interquartile range.

21. The method of claim 17 wherein the statistical measure of variation comprises range.

22. The method of claim 17 wherein the statistical measure of variation comprises median absolute variation.

23. The method of claim 13 further comprising, deleting from the measured interval travel times having values outside a selected validity threshold.

24. The method of claim 13 further comprising normalizing each measured travel time for a distance between the respective transmitter and receiver.

* * * * *